United States Patent [19]
Sallstrom et al.

[11] Patent Number: 5,291,842
[45] Date of Patent: Mar. 8, 1994

[54] HIGH PRESSURE LIQUID CONTAINMENT JOINT FOR HYDRAULIC AERATOR

[75] Inventors: Steven A. Sallstrom, Minnetonka; Gary R. Lamusga, Prior Lake; Charles C. Holley, Bloomington, all of Minn.

[73] Assignee: The Toro Company, Bloomington, Minn.

[21] Appl. No.: 18,350

[22] Filed: Feb. 16, 1993

Related U.S. Application Data

[63] Continuation of Ser. No. 723,882, Jul. 1, 1991, abandoned.

[51] Int. Cl.$^5$ ............................................. A01C 23/02
[52] U.S. Cl. .................................. 111/127; 285/220; 277/112
[58] Field of Search ............... 111/127; 285/212, 220, 285/901, 918, 347, 334.2, 384, 386, 332; 138/89; 277/102, 112, 115, 168, 170, 171

[56] References Cited

U.S. PATENT DOCUMENTS

| | | | |
|---|---|---|---|
| 3,016,250 | 1/1962 | Franck | 285/347 |
| 3,240,515 | 3/1966 | Schmohl | 285/220 X |
| 3,606,358 | 9/1971 | Tobler | 285/220 X |
| 3,618,988 | 11/1971 | Zurmuehlen | 285/347 |
| 4,498,680 | 2/1985 | Schobbe | 277/112 |
| 4,817,994 | 4/1989 | Bronnert | 285/93 |
| 5,101,745 | 4/1992 | Podevels et al. | 111/127 |

FOREIGN PATENT DOCUMENTS 723209  2/1955  United Kingdom ............... 285/918

OTHER PUBLICATIONS

SAE Standard J514, dated 1980.
Fluid Line Products, Inc. Uniport 10 K Brochure, copyright date unknown but believed to have been published in 1990.

Primary Examiner—Randolph A. Reese
Assistant Examiner—Spencer Warnick
Attorney, Agent, or Firm—Donald S. Trevarthen

[57] ABSTRACT

A high pressure liquid containment joint in an apparatus for injecting high pressure liquid into turf. A preferred high pressure liquid containment joint includes an O-ring (72). The high pressure liquid containment joint also includes a cylindrical plug (70). The plug (70) includes a first end and a second end, external threads (71) located between the first and second ends, a shoulder (73) for accepting the O-ring (72) wherein the shoulder (73) is located between the external threads (71) and the second end. The plug (70) also includes a hexhead (75) connected with the first end for accepting rotational force. The high pressure liquid containment joint also includes a high pressure liquid containment vessel for containing high pressure liquid wherein the vessel includes a threaded bore (74) wherein the bore (74) includes internal threads (172) for engaging the external threads (71) and two, smooth machined frusto-conical surfaces (174, 175) for contacting the O-ring. The O-ring (72) and the frusto-conical surfaces (174, 175) form a liquid impermeable barrier when the external threads (71) engage the internal threads (172) and the plug (70) and the O-ring (72) are rotated relative to the threaded bore (74) and wherein the barrier lies between the high pressure liquid and the external and internal threads (71, 172) whereby stresses on the internal threads (172) in the containment vessel are reduced resulting in a reduced chance of structural failure of the containment vessel.

2 Claims, 6 Drawing Sheets

HIGH PRESSURE LIQUID CONTAINMENT JOINT FOR HYDRAULIC AERATOR

This is a continuation of application Ser. No. 07/723,882, filed Jul. 1, 1991, which was abandoned upon the filing hereof.

TECHNICAL FIELD

This invention pertains to an apparatus which utilizes the discharge of a high pressure fluid to cultivate and aerate turf. Specifically, this invention pertains to a high pressure liquid containment joint in an apparatus utilizing the discharge of high pressure liquid to cultivate and aerate turf.

BACKGROUND OF THE INVENTION

Turf grasses are utilized for functional, recreational and aesthetic purposes, including, but not limited to, the playing surfaces of turf facilities of golf courses, parks, sports fields, cemeteries, highway right-of-ways and industrial and home lawns. Intensive use of a turf area and maintenance operations often result in turf wear and soil compaction. This compaction reduces large, or macro, pore space and total pore space in the soil which in turn reduces water infiltration into the soil, percolation through the soil, and drainage out of the soil; limits exchange of soil gasses, especially soil oxygen, with the atmosphere; and tends to restrict and reduce root growth and development of turf grasses, for example, causing, in some cases, substantial reduction of the root system and often death of deeper roots.

The proper cultivation of turf to enhance drainage, and thereby thorough root growth, and improve the soil-air-water relationship has long been a problem within the industry and a great number of devices have been proposed in the past in an effort to find a solution.

Core cultivation (aerification) is widely utilized as a long term program to alleviate compacted conditions in the soil root zone. Several different types of core cultivation equipment are available commercially. One such type is The Toro Company's Greens Aerator. Core cultivation equipment utilizes vertically operating hollow or solid metal tines which are forcibly driven into the turf to a depth of 2½ to 3 inches and extract a plug, or core, of the turf which is then deposited on the turf surface of the green. In all instances, the cores are collected and removed from the green and may be dried and used in a mix which is returned to the green to fill the holes. Research has shown that core cultivation creates a serious problem. Repeatedly forcing the metal tines into the turf to a common depth will, over time, create a compacted subsurface layer of soil, sometimes called "plow sole," at a depth about 1 inch deeper than the length of the tines, in other words at about 3½ to 4 inches below the surface of the turf. Further, the metal tines also tend to glaze the soil and create some compaction along the sides of the coring hole. This subsurface compaction creates two major problems with turf management. First, the compacted layer interferes with proper water movement within the soil, and second, the compacted soil interferes with proper root growth of the turf grasses. In addition to the compaction problem, core cultivation creates another problem—the removal or utilization of the removed turf cores. Present techniques often leave a golf green unplayable for two to three days after treatment. The high pressure liquid containment joint of the present invention is incorporated in an apparatus which will allow immediate turf and subsoil treatment at the time treatment is needed rather than waiting for a convenient time, and thus allows immediate use of the treated turf.

The high pressure liquid containment joint of the present invention is incorporated in a unique apparatus for accomplishing subsoil cultivation which utilizes periodic turf and soil injection of a substantially incompressible liquid, such as water, in a pattern, and at sufficient pressure, to lift and fracture the soil to reduce the compaction, or general density, of the treated area. The apparatus, in utilizing high pressure liquid to cultivate turf, incorporates components for pressurizing and routing the high pressure liquid. The components include a high pressure pump, a pump head incorporating various water passages and check valves, an accumulator for storing pressurized water and a discharge manifold with nozzles. These components incorporate high pressure liquid seals at various joints to contain the high pressure liquid. These high pressure liquid containment joints must have a high degree of structural integrity in an environment with high liquid pressure loads and high frequency pressure spikes while, at the same time, forming a liquid impermeable barrier. Such joints typically incorporate fastening means, such as threads, on the components to be joined, and a resilient sealing member, such as a flexible O-ring, which forms a liquid impermeable barrier when the threaded joint is tightened.

Prior art high pressure liquid containment joints incorporate various combinations of O-rings and threads to form liquid impermeable barriers while maintaining some degree of structural integrity. One prior art high pressure liquid containment joint, e.g., as shown in SAE Standard J514 dated 1980, incorporates an O-ring, a cylindrical plug with external threads located between the two ends of the plug, and an internally threaded containment vessel for accepting the cylindrical plug. When the threaded plug is engaged with the internal threads on the containment vessel and the plug is rotated, the plug is drawn into the containment vessel wherein one end of the plug contacts the high pressure liquid. The O-ring is located between the external threads of the plug and the plug end opposite the high pressure liquid. Accordingly, the high pressure liquid surrounds, contacts and exerts considerable force on the threaded portion of the joint since the high pressure liquid is restrained only by the O-ring, which does not protect the threads from the high pressure liquid. This particular prior art joint incorporates a smooth, tapered seat located just above the internal threads of the containment vessel. The seat is tapered so that the resilient O-ring, which is placed on the plug before the plug is tightened into the internally threaded containment vessel, will slide down and will seat on the smooth tapered surface without crushing or otherwise damaging the O-ring as the plug is tightened. While this particular high pressure liquid containment joint is effective in creating a liquid impermeable barrier, it does subject the threaded portion of the joint to substantially high stresses since the high pressure liquid contacts and surrounds the threads. The threaded portions of the joint, especially the internally threaded area of the containment vessel, are inherently more susceptible to stress induced failures due to the stress concentration factors associated with threads.

Another prior art high pressure liquid containment joint, e.g., as shown in U.S. Pat. No. 4,817,994, incorporates a resilient O-ring, a cylindrical plug with external threads located between the two ends of the plug, and an internally threaded containment vessel for accepting the cylindrical plug when the externally threaded plug is engaged with the internal threads on the containment vessel. When the threaded portion of the containment vessel, which rotates freely relative to the remainder of the containment vessel, is rotated, the plug is drawn into the containment vessel. In this prior art high pressure liquid containment joint design, the O-ring is located on the flat end face of the plug that contacts a flat sealing surface on the liquid containment vessel. Since the threaded portion of the containment vessel rotates and draws the plug into the remainder of the containment vessel, the plug and the remainder of the containment vessel do not rotate relative to each other. Since the flat end face of the cylindrical plug and the flat sealing surface of the liquid containment vessel do not rotate relative to each other, the O-ring, which nests in a circumferential ring groove on the plug face and which also does not rotate relative to these two surfaces, is not damaged as the plug is drawn into the containment vessel. As the plug is drawn into the vessel, the O-ring contacts the sealing face and a liquid impermeable barrier is formed. Accordingly, the threaded portions of this high pressure liquid containment joint are not exposed to high pressure liquid. The threaded portions of this joint are, therefore, not directly subjected to the high pressure liquid loads, resulting in reduced stress on the threaded portions of the joint. However, as noted above, this joint does require the use of a high pressure containment vessel that incorporates a threaded portion which rotates independently of the remainder of the containment joint.

Another prior art high pressure liquid containment joint, e.g., as shown in Fluid Line Products, Inc.'s Uniport 10K System brochure, incorporates a resilient O-ring, an inner cylindrical plug with two ends, an outer cylinder concentrically surrounding the inner plug wherein the outer cylinder incorporates external threads located between the two ends of the outer cylinder, and wherein the liquid containment joint includes an internally threaded liquid containment vessel for accepting the inner plug and outer cylinder when the externally threaded cylinder is engaged with the internal threads of the containment vessel. The outer cylinder engages the inner plug so as to transfer the axial movement of the outer cylinder to the inner plug without transferring the rotational movement of the outer cylinder to the inner plug. The engagement of the outer cylinder to the inner plug is accomplished by a heat treated pressure ring which seats in an internal groove on the outer cylinder and an external groove on the internal plug, allowing the transmission of axial force between the cylinder and plug but prohibiting rotational force transmission between the two members. The resilient O-ring mounts on the inner plug in a circumferential groove located near the end of the inner plug which extends beyond the outer cylinder. When the outer cylinder, which retains the inner plug, engages the internal threads of the containment vessel and is rotated, the outer cylinder and the inner plug move axially into the containment vessel. The resilient O-ring, which is mounted on the internal plug, engages a smooth, cylindrical seat on the containment vessel as the outer cylinder is rotated and tightened in relation to the containment vessel. Since the O-ring moves only axially but does not rotate since it is mounted on the inner plug, the O-ring seats against the smooth, cylindrical seat in the containment vessel without incurring any substantial damage that would be incurred if the O-ring moved axially and rotationally along the cylindrical seat. The O-ring and the smooth, cylindrical seat seal the high pressure liquid in the containment vessel from the internal threads of the containment vessel and the external threads of the outer cylinder. The threaded portions of this high pressure joint, therefore, are not directly subjected to the high pressure liquid loads, resulting in reduced stress on the threaded portions of the joint. However, as noted above, this joint does require a separate outer cylinder which transmits axial, but not rotational, motion to the plug. This additional component permits the resilient O-ring to seal against the smooth cylindrical surface without subjecting the O-ring to any substantial damage.

The present invention addresses the problems associated with the prior art high pressure liquid containment joints discussed above. In particular, a preferred high pressure liquid containment joint according to the present invention incorporates the fewest possible number of parts while providing a liquid impermeable seal that protects the threads from being contacted by the high pressure liquid which, in turn, results in lower stresses on the threaded portions of the joint. A preferred high pressure liquid containment joint according to the present invention incorporates a plug with a first end and a second end and a liquid sealing element and external threads between the ends of the plug and means for accepting the liquid sealing element between the external threads and the second end and means on the plug for accepting rotational force. A preferred embodiment of the high pressure liquid containment joint of the present invention also incorporates a high pressure liquid containment vessel in fluid communication with a liquid pressurizing means wherein the vessel includes means for accepting the plug, the means including internal threads for engaging the external threads of the plug and means for contacting the liquid sealing element wherein the liquid sealing element and the contacting means form a liquid impermeable barrier when the external threads engage the internal threads and wherein the plug and said O-ring rotate relative to the containment vessel and wherein the barrier lies between the high pressure liquid and the external and internal threads whereby stresses on the internal threads of the containment vessel are reduced resulting in a reduced chance of failure of the containment vessel.

SUMMARY OF THE INVENTION

Accordingly, the present invention includes a high pressure liquid containment joint for an apparatus for injecting high pressure liquid into turf.

Specifically, this invention includes a high pressure liquid containment joint including a liquid sealing element. The high pressure liquid containment joint according to the present invention also includes a cylindrical plug with a first end and a second end. The cylindrical plug includes external threads located between the first end and the second end, and includes means for accepting the liquid sealing element wherein the liquid sealing element accepting means is located between the external threads and the second end. The plug also includes means connected with its first end for accepting rotational force. The high pressure liquid containment joint according to the present invention also includes a high pressure liquid containment vessel for containing the high pressure liquid wherein the vessel includes means for accepting the cylindrical plug. The plug accepting means includes internal threads for engaging the external plug threads and means for contacting the liquid sealing element wherein the liquid sealing element and the contacting means form a liquid impermeable barrier when the external threads engage the internal threads and the plug and the O-ring are rotated relative to the containment vessel and wherein the barrier lies between the high pressure liquid and the external threads and internal threads whereby stresses on the internal threads in the containment vessel are reduced resulting in a reduced chance of failure of the containment vessel.

BRIEF DESCRIPTION OF THE DRAWING

This invention will be further described with reference to the appended drawing, wherein.

DETAILED DESCRIPTION OF A PREFERRED EMBODIMENT

Referring to the drawing, wherein like numerals represent like parts throughout the several views, there is generally disclosed at 10 an apparatus for treating turf and reducing turf density. The apparatus 10 includes a frame generally designated at 11. The frame 11 forms a support for mounting the various components (to be described hereafter) of the apparatus 10.

The frame 11 is supported in part by three wheels 12, 13 and 14. A steerable rear wheel 14 has a hydraulic motor 15 operatively connected to its axle by means well known in the art. The hydraulic drive motor 15 has a mounting bracket 15a operatively connected to the motor. The mounting bracket 15a is operatively connected to a steering mount assembly 16. A control bar 18 extends upward from the steering mount assembly 16. Control bar 18 includes speed, braking and apparatus function controls 20 at its upper end.

A gas tank 30 is positioned on the rear end of the frame 11 and is operatively connected thereto. The gas tank 30 has a fill cap 30a through which gasoline may be poured. Gasoline passes through a line and shut off valve (not shown) from the gas tank 30 to the gasoline motor (not shown). The motor may be any suitable motor such as an Onan 24 HP gasoline motor. The controls to operate the motor are positioned and located at the side of the apparatus. These controls include a key switch 96, throttle 97, and choke 98.

The rear end of the frame 11 is always carried by the rear wheel 14. The front end of the frame 11 may be carried by either the front wheels 12 and 13 (if in a transport mode), or by a first roller 85 and a second roller 86 (when in a cultivating mode). Rollers 85 and 86 are generally parallel to each other and have a diameter of approximately 6 inches. The center lines of the rollers are mounted at a distance of approximately 10 inches, thereby leaving a space between the rollers, at their closest point, of approximately 4 inches. Rollers 85 and 86 are identical.

Figure 1:
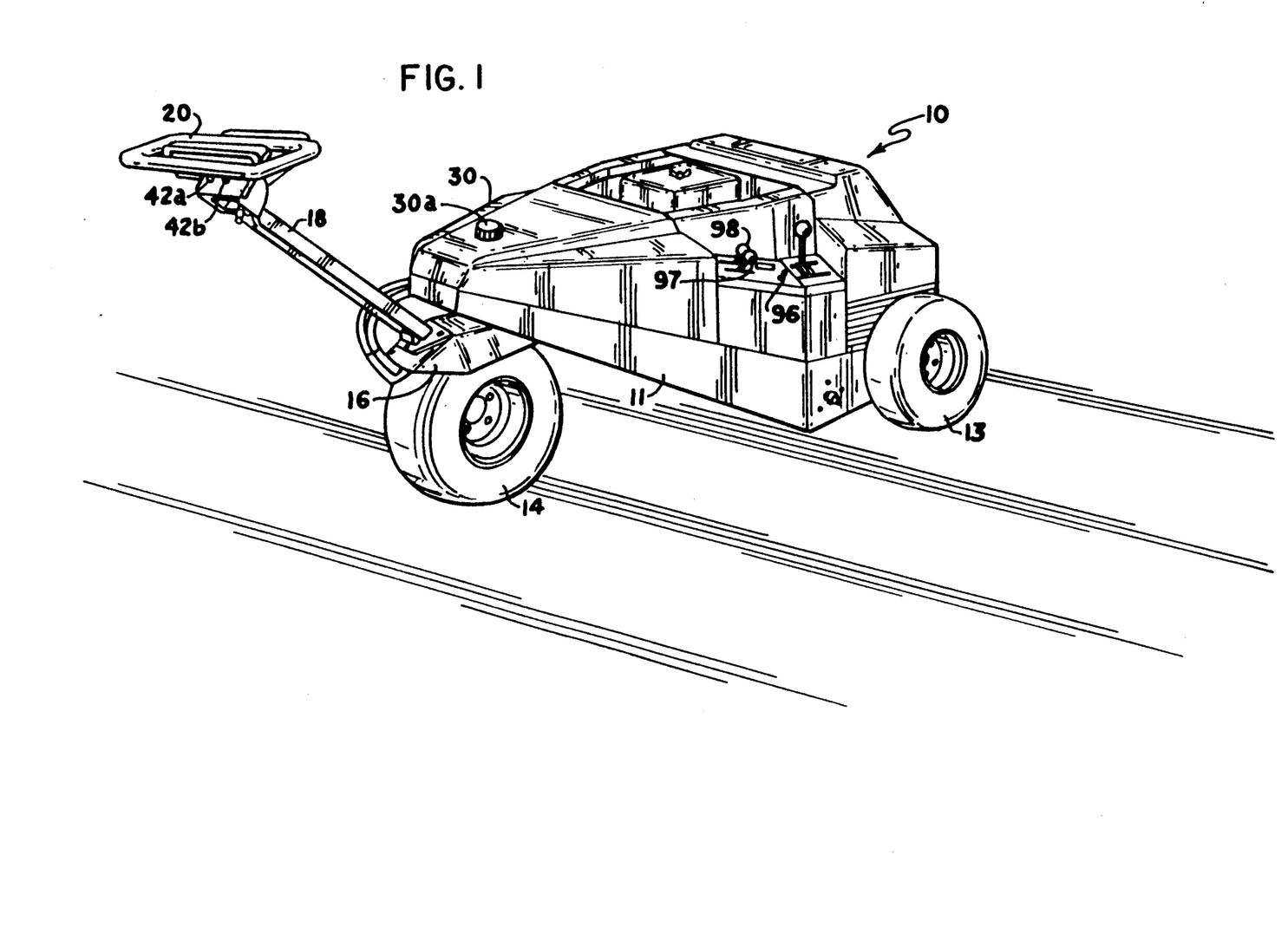
FIG. 1 is a perspective view of an apparatus for injecting high pressure liquid into the turf.
Figure 2:
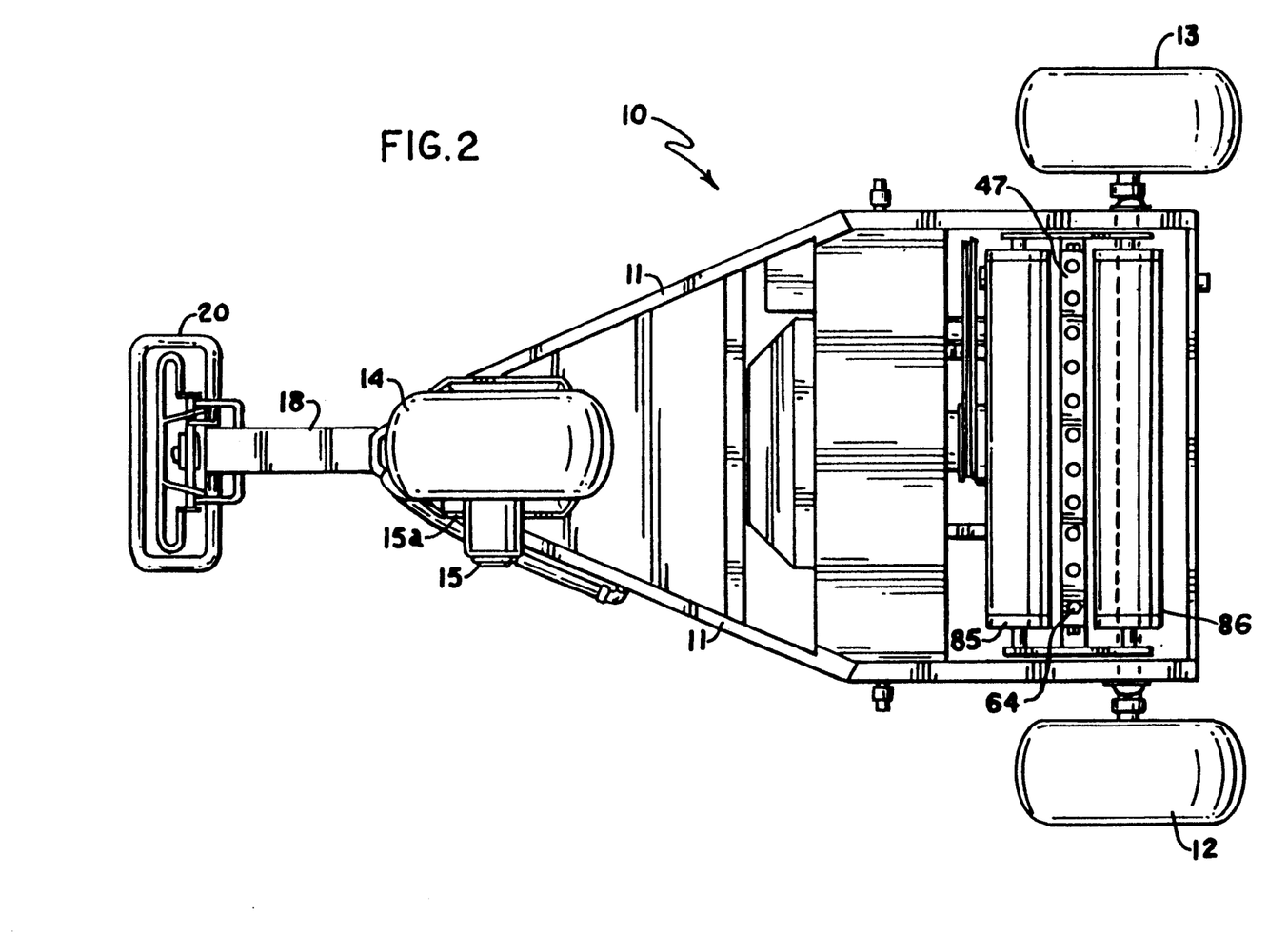
FIG. 2 is a bottom elevational view of the apparatus of FIG. 1.
Figure 3:
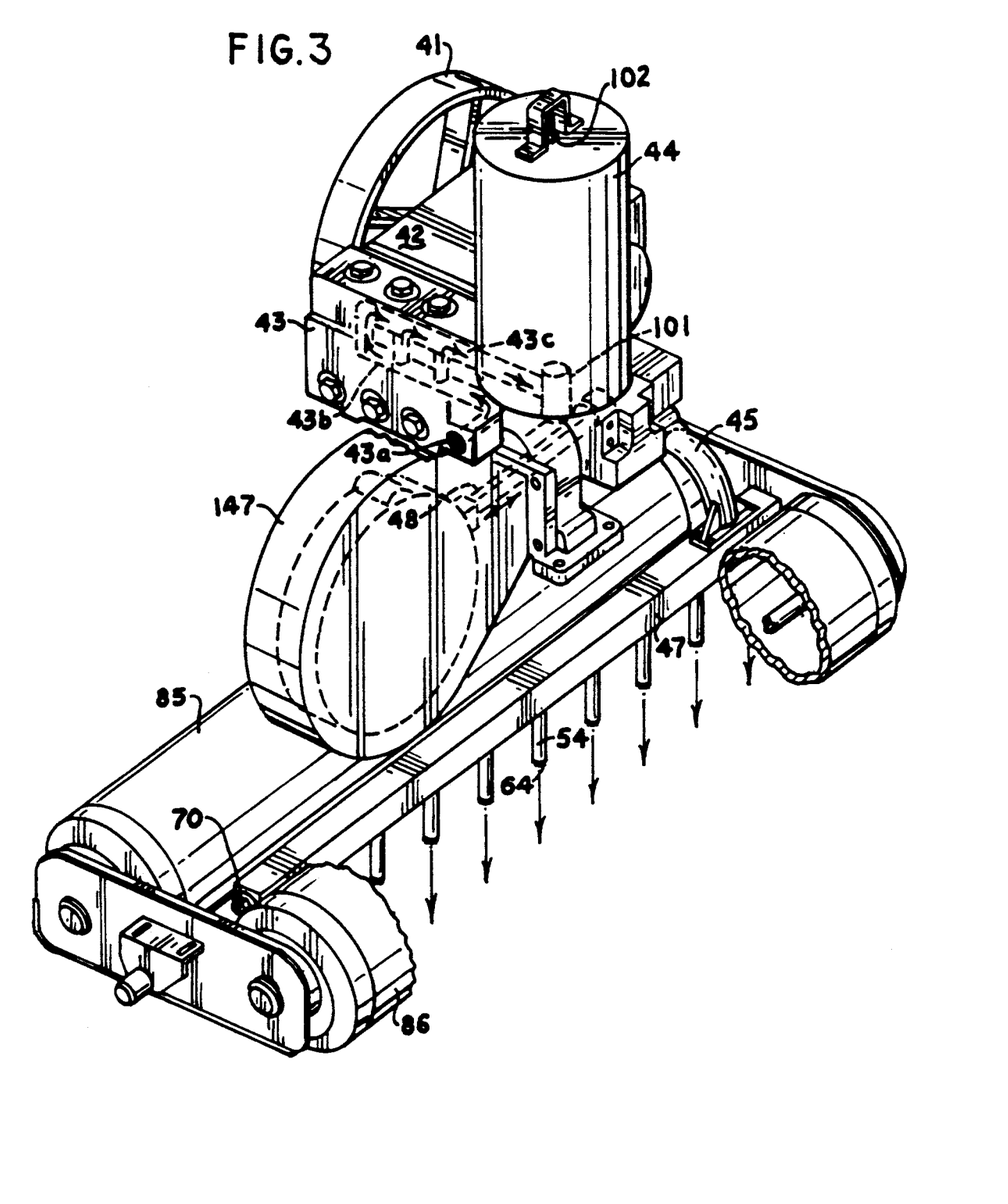
FIG. 3 is a perspective view of a high pressure liquid pump and discharge manifold assembly.

Referring to FIG. 3, the output shaft of the motor (not shown) is operatively connected to a pulley 41 mounted on the drive shaft of the water pump 42 which includes a 3 valve chamber 43, also known as a pump head, having an inlet 43a. The three valve chamber 43 is shown in detail in FIG. 5 and is discussed in more detail below. A gas pressure accumulator 44 is in fluid communication with the outlet port of the 3 valve chamber 43. The water pump 42 with the 3 way valve 43 and the accumulator 44 may be any suitable pump and an accumulator such as a Hawk HC600 pump from Hotsy Corporation of Colorado Springs or pump no. T3041 from General Pump Company. The system incorporates a 4 inch I.D. nitrogen charged accumulator A4J005C149J from Parker Hannifin Corporation of Hillsboro, N.C. The present system is designed to operate at a approximately 5000 PSI. Applicants have found that it is preferable to precharge the accumulator to greater than 2200 PSI, and preferably between 2400 to 2600 PSI. The output shaft of the motor is also operatively connected to a cam box 147. The output shaft of the motor runs at approximately 3200 RPM. The cam box 147 has a 10 to 1 reduction gear incorporated thereby having the cam within the box travel at approximately 320 RPM. The cam is designed to engage a valve 48 for reciprocal movement thereby opening and closing the flow into the discharge tube 45. The water pump controls are mounted on the control bar 18 and include a start button 42a and stop button 42b.

In FIG. 3, it can be seen that 3 valve chamber 43 has an inlet 43a in which the water will flow. The water, or other incompressible liquid, will flow through channel 43b at which time it will be pumped through the 3 valves and out under pressure through outlet channel 43c. The water, which is flowing under pressure out of the valve chamber 43, then enters the input 101 of accumulator 44. The accumulator increases in pressure to a preset pressure. As previously indicated, if the preset pressure is 5,000 PSI, the accumulator 44 has been precharged through an inlet 102 to approximately 2200 to 2500 PSI. The water then continues to enter the reservoir of the accumulator 44 through the input 101 until the preset pressure has been reached. High pressure water is stored in the accumulator 44 until it is released by valve 48.

High pressure water stored in the accumulator 44 is released by the valve 48. Valve 48 reciprocates between an open and closed position, the reciprocating motion being provided by the cam box 147. When valve 48 opens, high pressure water is released from the accumulator 44 into the discharge tube 45. Valve 48 opens and closes approximately 320 times per minute or 5.33 times per second, releasing high pressure water from the accumulator 101 at that frequency. The high pressure water then travels through the discharge tube 45 into the manifold 47. Discharge tube 45 is constructed of a suitable material such as a cast iron and incorporates a flange 46 which mounts to manifold 47. Manifold 47 is constructed of a suitable material such as a precipitation hardened stainless steel extrusion. Manifold 47 is supported by a manifold support 90. Manifold 47 incorporates several discharge nozzle assemblies 50 which release the high pressure water in a stream directed at the surface to be worked. Nozzle assemblies 50 include an O-ring 52, nozzle extension tube 54, a mounting flange 56, a check ball 58, a check spring 60, an O-ring 62, and a discharge nozzle 64. Two bolts 66 (one shown) retain the discharge nozzle assembly 50 onto the manifold 47. Manifold 47 also incorporates two end plugs 70 (one shown), which act as closures for the ends of the extruded manifold 47. End plugs 70 are threaded into the manifold 47. O-ring 72 fits between plug 70 and threaded bore 74 of manifold 47 to form a liquid impermeable barrier.

Figure 4:
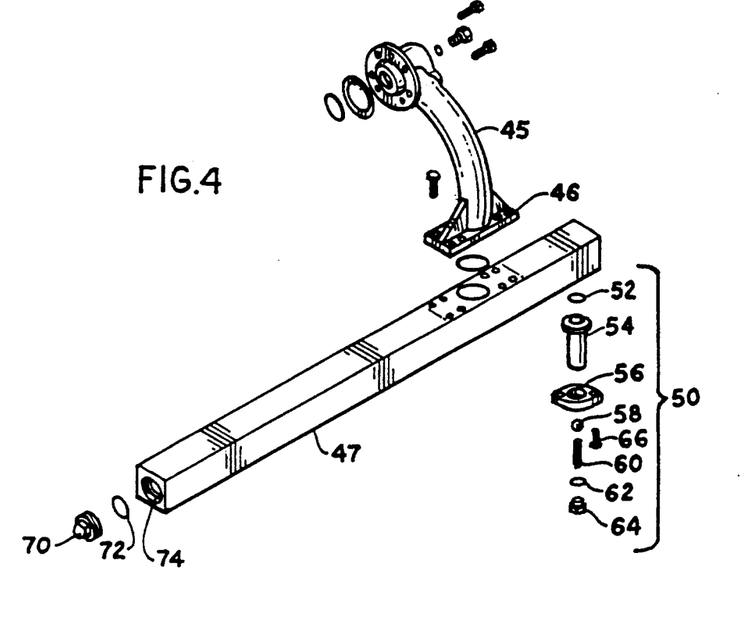
FIG. 4 is an exploded view of a high pressure liquid discharge manifold assembly.
Figure 5:
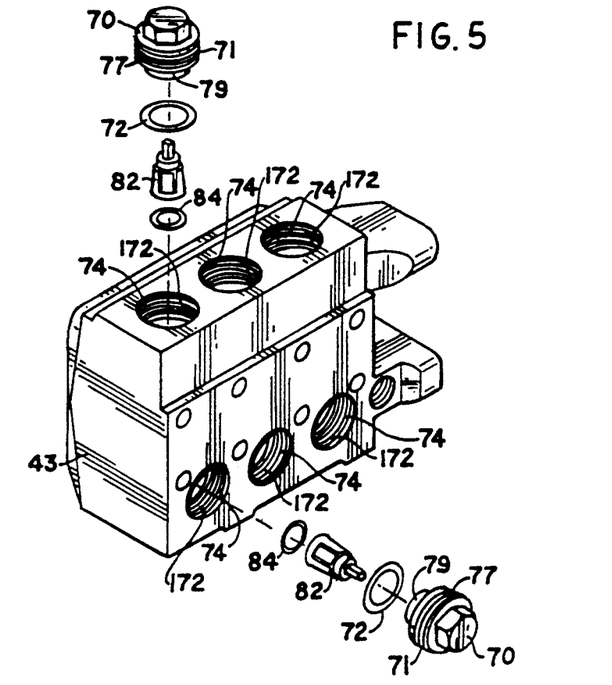
FIG. 5 is an exploded view of a high pressure liquid pump assembly.
Figure 6:
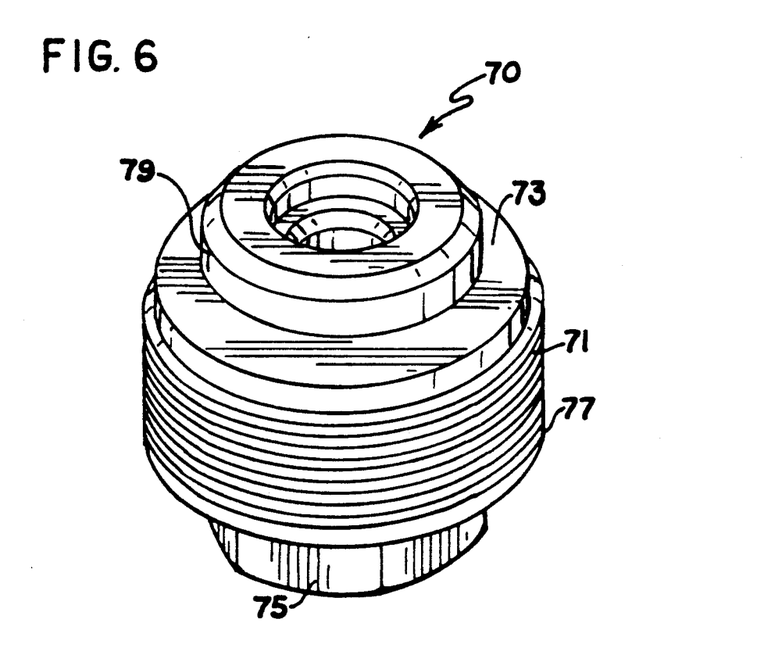
FIG. 6 is a perspective view of a high pressure cylindrical plug.

The present invention centers around the plug closures of the manifold 47 (see FIG. 4) and the plug closures of the 3 valve chamber 43 (see FIG. 5). Referring to FIG. 4, end plug closures for manifold 47 consist of plug 70 and O-ring 72 which, together, act as end closures for the hollow manifold 47. The ends of the manifold 47 have threaded bores 74 which engage the threads on plugs 70. Referring to FIG. 5, the three valve chamber 43 is shown with six threaded bores 74, which provide access to the check valves 82 (two of six shown) utilized within the valve chamber 43. The check valves 82 control flow within the valve chamber 43. Check valves 82 seat against O-rings 84 which mount between the check valves 82 and machined faces of valve chamber 43. Check valves 82 are retained within chamber 43 by plugs 70 and O-rings 72. Plugs 70 and O-rings 72 also serve as access port closures for the valve chamber 43 and its check valves 82.

Both manifold 47 and valve chamber 43 are subjected to high cyclical loads at high frequencies from the high pressure water released through the accumulator 44 by reciprocating valve 48. The high pressure water flows through the valve chamber 43 and the manifold 47, imparting the high frequency, high amplitude loads on these components. Since the load frequency and amplitudes are high, it is imperative that the valve chamber 43 and the manifold 47 have a high degree of structural integrity. Structural integrity required in this application is particularly difficult to achieve in component areas which incorporate threads. Specifically, the internally threaded bores 74 of the manifold 47 and valve chamber 43 are highly susceptible to structural damage due to the high amplitude and frequency loads created by the high pressure water and the inherently uneven profile of the threaded surface and the high stress concentrations that result.

The present invention includes a unique high pressure liquid containment joint for containing the high pressure water while maintaining the structural integrity of the internally threaded valve chamber 43 and manifold 47. As shown in FIGS. 4, 5, 6, 7 and 8, the high pressure liquid containment joint incorporated at the ends of the manifold 47 and in the three valve chamber 43 includes a plug 70 with external threads 71. External threads 71 are 1 3/8-12 UNF-2A designation threads. Plug 70 includes a shoulder 73 for accepting an O-ring 72. O-ring 72 is constructed of a suitable material such as polyurethane. Plug 70 also includes a hex head 75 for accepting a wrench rotating plug 70 for tightening. Plug 70 is formed so as to incorporate the external threads 71 on a larger diameter journal 77 while a smaller diameter journal 79 serves as a seat, with shoulder 73, for the O-ring 72. Smaller journal 79 of plug 70 fits within the counterbore 170 of threaded bore 74. Plug 70 is constructed of a suitable material such as AISI type 303 stainless steel.

Figure 7:
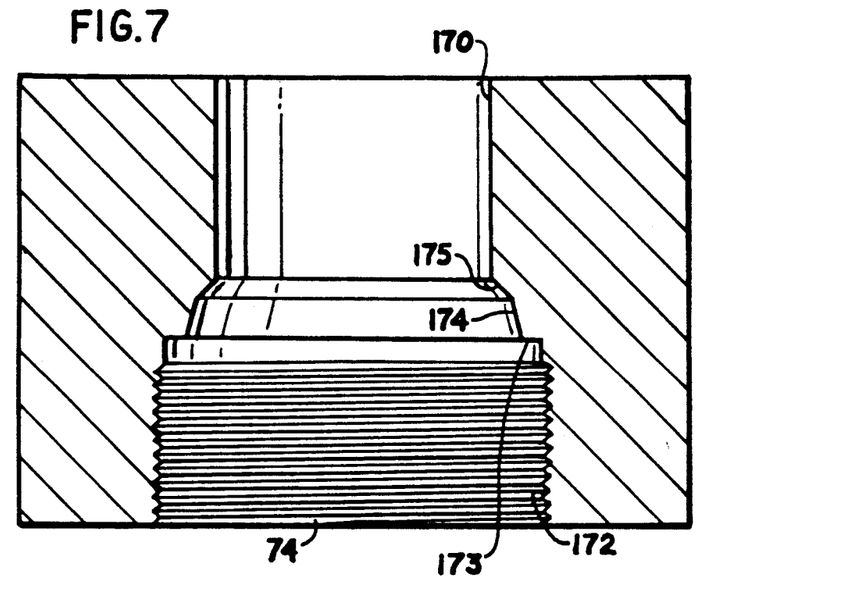
FIG. 7 is a sectional view of a high pressure liquid containment vessel for receiving a cylindrical plug.

The high pressure liquid containment joint incorporated at the ends of manifold 47 and in the 3 valve chamber 43 also incorporate a threaded bore 74. Threaded bore 74 incorporates internal threads 172 which engage the external threads 71 of plug 70. Internal threads 172 are also 1 3/8-12 UNF-2A designation threads. Threaded bore 74 also incorporates a shoulder 173 which abuts shoulder 73 of plug 70. Threaded bore 74 also includes smooth tapered surfaces 174 and 175. Surfaces 174 and 175 contact the O-ring 72 which seats on the plug 70. Surface 174 is adjacent shoulder 173 and is machined so as to provide a frusto-conical surface running 15 degrees off of the center-line of the threaded bore 74. Surface 175 is adjacent to surface 174 and counterbore 170. Surface 175 is machined so as to provide a frusto-conical surface running 45 degrees off of the centerline of the threaded bore 74.

Figure 8:
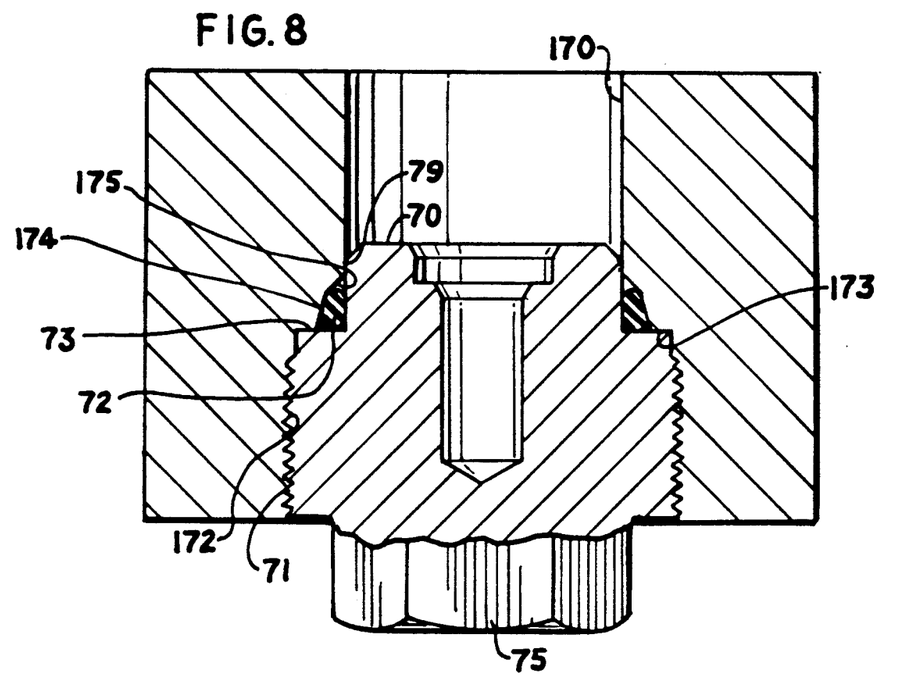
FIG. 8 is a sectional view of a high pressure liquid containment joint.

In operation, the O-ring 72 is placed on the shoulder 73 of the plug 70. The plug 70 is then placed into the threaded bore 74 so that the external threads 71 of the plug 70 engage the internal threads 172 of the threaded bore 74. Plug 70 is tightened into the threaded bore 74 when rotational force is applied to the hexhead 75 of the plug 70, causing the plug 70 to rotate and the internal threads 172 and the external threads 71 to further engage. This further thread engagement causes the plug 70 to move axially into the threaded bore 74. As the plug 70 moves further into the threaded bore 74, the O-ring 72, which is seated on the shoulder 73 of the plug 70, begins to contact the smooth frusto-conical surface 174. Further tightening of the plug 70 causes the O-ring 72 to compress as it is moved along the surface 174. However, the compression is gradual and the smooth tapered surface 174 allows the O-ring 72 to slide down the surface 174 during compression without damaging the structural integrity of the O-ring 72. As the O-ring 72 is moved into contact with the frusto-conical surface 175 and further compressed between the plug 70 and the surface 175, a liquid impermeable barrier is formed between the counterbore 170, where high pressure liquid is located in both the manifold 47 and the three valve chamber 43, and the internal and external threads, 172 and 71 respectively. This liquid impermeable barrier, in keeping the internal and external threads, 172 and 71, respectively, dry, reduces the threads' exposure to the high frequency, high amplitude loads imparted by the high pressure liquid. This reduced exposure results in a reduced chance of structural failure at or near the threaded areas of the joint. As discussed above, the threaded areas are especially susceptible to structural failure under high amplitude and high frequency loading due to the inherently uneven profile of the threaded surface and the high stress concentrations that result.

A preferred embodiment of the invention is described above. Those skilled in the art will recognize that many embodiments are possible within the scope of the invention. Variations and modifications of the various parts and assemblies can certainly be made and still followed in the scope of the invention. Thus the invention is limited only to the apparatus recited in the following claims and the equivalence thereof.

I claim:

1. In an apparatus for injecting high pressure liquid into the turf comprising a frame, means for propelling said apparatus, a plurality of fluid nozzles, means for pressurizing liquid to between about 2300 and 6500 pounds per square inch, means for providing a source of liquid to said pressurizing means, and means for controlling flow of the liquid from said pressurizing means to said nozzles at a pressure sufficient to cause the liquid to penetrate the turf, a high pressure liquid containment joint comprising:

(a) a polyurethane O-ring;
(b) a cylindrical plug comprising:
  (i) a first end and a second end;
  (ii) external threads located between said first and second ends;
  (iii) means for accepting said polyurethane O-ring wherein said accepting means comprises a planar shoulder on said plug located between said external threads and said second end; and
  (iv) means connected with said first end for accepting rotational force; and
(c) a high pressure liquid containment vessel in fluid communication with said pressurizing means suitable for containing high pressure liquid wherein the vessel comprises means for accepting said cylindrical plug, said plug accepting means comprising:
  (i) internal threads for engaging said external threads; and
  (ii) means for contacting said polyurethane O-ring comprising a smooth, tapered surface wherein said O-ring slides along said surface when said external threads engage said internal threads whereby said O-ring is not significantly damaged during the thread engaging operation and wherein said tapered surface comprises a first frusto-conical surface adjacent to said planar shoulder and a second frusto-conical surface adjacent to said first frusto-conical surface and distal from said planar shoulder;

wherein said polyurethane O-ring and said contacting means form a liquid impermeable barrier when said external threads engage said internal threads and said plug and said polyurethane O-ring are rotated relative to said containment vessel and wherein said barrier lies between said high pressure liquid and said external threads and said internal threads whereby stresses on said internal threads in said containment vessel are reduced resulting in a reduced chance of failure of said containment vessel and wherein said first frusto-conical surface comprises a frusto-conical surface oriented 15 degrees off of an imaginary cylinder concentric with the centerline of said first frusto-conical surface and wherein said second frusto-conical surface comprises a frusto-conical surface oriented 45 degrees off of an imaginary cylinder concentric with the centerline of said second frusto-conical surface and wherein said high pressure liquid containment vessel comprises a hollow, extruded hardened stainless steel manifold wherein said nozzles provide outlets for said high pressure liquid in said manifold and wherein said plug provides a closure for said hollow manifold.

2. In an apparatus for injecting high pressure liquid into the turf comprising a frame, means for propelling said apparatus, a plurality of fluid nozzles, means for pressurizing liquid to between about 2300 and 6500 pounds per square inch, means for providing a source of liquid to said pressurizing means, and means for controlling flow of the liquid from said pressurizing means to said nozzles at a pressure sufficient to cause the liquid to penetrate the turf, a high pressure liquid containment joint comprising:

(a) a polyurethane O-ring;
(b) a cylindrical plug comprising:
  (i) a first end and a second end;
  (ii) external threads located between said first and second ends;
  (iii) means for accepting said polyurethane O-ring wherein said accepting means comprises a planar shoulder on said plug located between said external threads and said second end; and
  (iv) means connected with said first end for accepting rotational force; and
(c) a high pressure liquid containment vessel in fluid communication with said pressurizing means suitable for containing high pressure liquid wherein the vessel comprises means for accepting said cylindrical plug, said plug accepting means comprising:
  (i) internal threads for engaging said external threads; and
  (ii) means for contacting said polyurethane O-ring comprising a smooth, tapered surface wherein said O-ring slides along said surface when said external threads engage said internal threads whereby said O-ring is not significantly damaged during the thread engaging operation and wherein said tapered surface comprises a first frusto-conical surface adjacent to said planar shoulder and a second frusto-conical surface adjacent to said first frusto-conical surface and distal from said planar shoulder;

wherein said polyurethane O-ring and said contacting means form a liquid impermeable barrier when said external threads engage said internal threads and said plug and said polyurethane O-ring are rotated relative to said containment vessel and wherein said barrier lies between said high pressure liquid and said external threads and said internal threads whereby stresses on said internal threads in said containment vessel are reduced resulting in a reduced chance of failure of said containment vessel and wherein said first frusto-conical surface comprises a frusto-conical surface oriented 15 degrees off of an imaginary cylinder concentric with the centerline of said first frusto-conical surface and wherein said second frusto-conical surface comprises a frusto-conical surface oriented 45 degrees off of an imaginary cylinder concentric with the centerline of said second frusto-conical surface and wherein said high pressure liquid containment vessel comprises a pump head having a passage for said high pressure liquid, said pump head comprising:
  (a) a check valve; and
  (b) service access means for said check valve;
wherein said plug provides a closure for said service access means.

* * * * *